(12) United States Patent
Hickey

(10) Patent No.: US 7,690,250 B2
(45) Date of Patent: Apr. 6, 2010

(54) METHOD FOR MEASURING SURFACE CURRENTS USING A LONG-RANGE SINGLE STATION HIGH FREQUENCY GROUND WAVE RADAR SYSTEM

(76) Inventor: Kenneth J. Hickey, 167 Patrick Street, St. John's, Newfoundland (CA) A1C 5C3

( * ) Notice: Subject to any disclaimer, the term of this patent is extended or adjusted under 35 U.S.C. 154(b) by 0 days.

(21) Appl. No.: 12/228,057

(22) Filed: Aug. 8, 2008

(65) Prior Publication Data

US 2009/0078037 A1    Mar. 26, 2009

Related U.S. Application Data

(60) Provisional application No. 60/965,070, filed on Aug. 17, 2007.

(51) Int. Cl.
*G01P 5/00* (2006.01)
(52) U.S. Cl. .................................. 73/170.11
(58) Field of Classification Search .................. None
See application file for complete search history.

(56) References Cited

U.S. PATENT DOCUMENTS

| | | | |
|---|---|---|---|
| 4,172,255 A | * | 10/1979 | Barrick et al. ............ 342/26 D |
| 4,924,698 A | | 5/1990 | Echert et al. |
| 4,996,533 A | | 2/1991 | May et al. |
| 6,590,523 B2 | | 7/2003 | Barrick |
| 7,007,555 B2 | * | 3/2006 | Strong et al. ............. 73/861.18 |
| 7,187,619 B2 | | 3/2007 | Arvelo, Jr. et al. |
| 7,539,082 B2 | * | 5/2009 | Vogt ............................ 367/90 |

* cited by examiner

*Primary Examiner*—Lisa M Caputo
*Assistant Examiner*—Jermaine Jenkins
(74) *Attorney, Agent, or Firm*—James Ray & Assoc.

(57) ABSTRACT

A method for measuring ocean surface currents using a long-range single station high frequency ground wave radar system includes the steps of forming a rectilinear grid based region, dividing the rectilinear grid into a plurality of sub-regions each having a uniform surface current flow therewithin, spanning each sub-region with a predetermined plurality of radial beam lines from the single radar station, dividing each radial beam line into a pre-selected plurality of radial sub-nodes, measuring radial surface current vector projection at each radial sub-node, inputting each radial surface current vector projection into a multiple regression model having two regressors, determining, with the multiple regression model, surface vector components along each of x and y axis, storing the surface vector components determined in step (g) to a database, and editing, with equation of continuity based algorithm, plurality of surface vector components stored in the database.

13 Claims, 4 Drawing Sheets

METHOD FOR MEASURING SURFACE CURRENTS USING A LONG-RANGE SINGLE STATION HIGH FREQUENCY GROUND WAVE RADAR SYSTEM

CROSS-REFERENCE TO RELATED APPLICATIONS

This application is related to and claims priority from Provisional Patent Application Ser. No. 60/965,070 filed on Aug. 17, 2007.

FIELD OF THE INVENTION

The present invention relates, in general, to surface currents and, more particularly, this invention relates to a method for measuring ocean surface currents using a long-range single station high frequency ground wave radar system.

BACKGROUND OF THE INVENTION

As is generally well known, conventional practice of mapping surface currents, which transport floating objects, vessels or pollutants, employs a pair of spaced apart shore-based radar stations that can survey the same oceanic region, but from different vantage points. The data from both stations are combined, in a vector addition sense, to determine the total surface current field. However, due to the cost and complexity of two-radar installations, efforts have been made to map surface currents utilizing a single radar.

U.S. Pat. No. 4,996,533 issued to May et al. discloses the use of a pulsed monostatic radar operating in the HF/VHF range and using a single transmitting antenna with a wide beam width. There is a linear array of antennas, each with its own receiver/digitizer system to sample the complex signal. The summing and phasing of the signals is done in software. The correlation functions are calculated using two successive complex Fourier transforms. The current vectors are measured as a function of range and angle from the radar site, thereby generating the current map.

However, Barrick (1990) proved that this method works only when flow direction is known with respect to the radar beam.

Subsequently, Barrick taught in U.S. Pat. No. 6,590,523 systems and methods for synthesis of total surface current vector maps by fitting normal modes to radar data. This method includes extracting a scalar data set from a radar signal from a radar. Radial velocity components are calculated from the radar signal. These components are fitted to a set of scalar eigenfunctions and eigenvalues to simultaneously solve for the best set of normal modes and the corresponding set of constants. The corresponding set of constants represents a corresponding set of amplitudes. The set of constants and the set of normal modes are used to create a two dimensional vector field used in creating a total vector map.

However, it is believed that Barrick's method is only useful in regions where there are known Eddie currents. It is unclear from Barrick's patent how his methods perform in uniform surface current zones.

Furthermore, both May et al. and Barrick use complex mathematical equations to map surface currents and are limited to short-range system, approximately 50 kilometer range from the radar site.

Therefore, there is a need for a method for determining long-range surface currents from a high frequency single radar station.

SUMMARY OF THE INVENTION

In accordance with one embodiment, the invention provides a method for measuring ocean surface currents using a long-range single station high frequency ground wave radar system. The method includes the step of selecting a target region with a uniform surface current flow from a coverage area of the single radar system. Then, spanning the target region with a predetermined plurality of radial beam lines from the single radar station. Next, dividing each radial beam line into a pre-selected plurality of radial sub-nodes. Measuring, with the single radar system, radial surface current vector projection at each radial sub-node. Next, inputting each radial surface current vector projection into a multiple regression model having two regressors. Finally, determining, with the multiple regression model, surface vector component values along each of x and y axis.

In accordance with another embodiment, the invention provides a method for measuring ocean surface currents using a long-range single station high frequency ground wave radar system. The method includes the step of forming a rectilinear grid based region. Next, dividing the rectilinear grid into a plurality of sub-regions each having a uniform surface current flow therewithin. Then, spanning each sub-region with a predetermined plurality of radial beam lines from the single radar station. Dividing each radial beam line into a pre-selected plurality of radial sub-nodes. Next, measuring radial surface current vector projection at each radial sub-node. Then, inputting each radial surface current vector projection into a multiple regression model having two regressors. Determining, with the multiple regression model, surface vector components along each of x and y axis. Then, storing the surface vector components to a database. Finally, editing, with equation of continuity based algorithm, plurality of surface vector components stored in the database.

OBJECTS OF THE INVENTION

It is, therefore, one of the primary objects of the present invention to provide a method for measuring ocean surface currents using a long-range single station high frequency ground wave radar system.

Another object of the present invention is to provide a for measuring ocean surface currents using a long-range single station high frequency ground wave radar system in a plurality of sub-regions each having a distinct surface current flow direction.

Yet another object of the present invention is to provide a for measuring ocean surface currents using a long-range single station high frequency ground wave radar system that measures radial current component of such surface current along the radial radar beam line.

A further object of the present invention is to provide a for measuring ocean surface currents using a long-range single station high frequency ground wave radar system that employs a system of equations representing a multiple regression model having two regressors.

Yet a further object of the present invention is to provide for measuring ocean surface currents using a long-range single station high frequency ground wave radar system that eliminates zones of non-uniform surface current flow.

An additional object of the present invention is to provide a for measuring ocean surface currents using a long-range single station high frequency ground wave radar system that eliminates zones of non-uniform surface current flow by employing equation of continuity.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
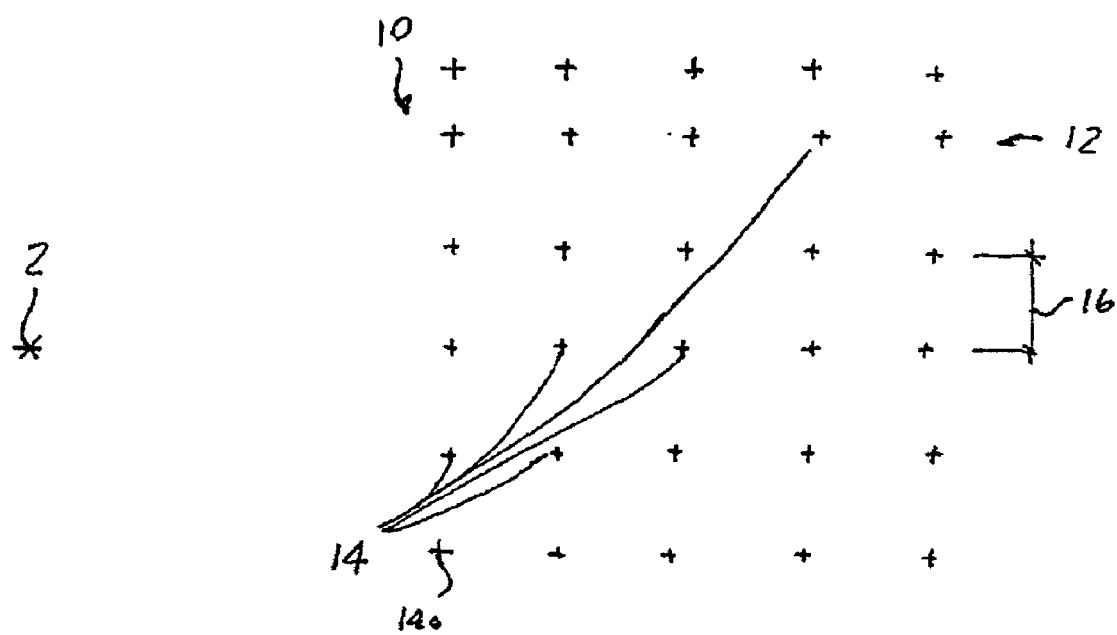
FIG. 1 illustrates a rectilinear grid representation of a surface current flow region monitored by a shore-based high frequency single radar site.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of surface currents applies to surface currents comprising the upper region of the ocean surface of about one meter in height.

The present invention provides for measuring ocean surface currents using a long-range single station high frequency ground wave radar system.

The best mode for carrying out the invention is presented in terms of its presently preferred forms, herein depicted within FIGS. 1 through 7. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The method includes the step of selecting a target region 10 from a coverage area of the single radar station 2. Now in a particular reference to FIG. 1, this step includes the step of forming a rectilinear grid 12 by selecting a plurality of nodes 14 in each of a longitudinal and latitudinal direction and then selecting separation interval 16 between a pair of adjacent nodes 14. The grid 12 may be formed by first selecting each of a longitudinal and latitudinal coordinate of a corner node 14a of the target region 10. It would be appreciated that the target region 10 may be selected as an entire coverage area of the single radar station 2 or a predetermined portion thereof. The separation interval 16 between the nodes 14 is generally established based on the requirements for visual mapping of the surface currents within the grid 12 with a larger spacing 16 being advantageous in improving visualization thereof. It has been found that separation interval 16 of between about 10 kilometers to about 20 kilometers is adequate to visually display surface currents. Same or different separation interval 16 may be used for each of the longitudinal and latitudinal direction.

In accordance with one form of the present invention it is stipulated that surface current V is uniform over a specific sub-region which is smaller than the region 10 and also that the surface current V within a pair of adjacent sub-region may differ at least in one of magnitude and direction. Subsequently, a target sub-region 20 is established about each node 14 where the surface current is assumed to be uniform and is represented by a circle in FIGS. 2-3. The center of each sub-region 20 is considered to coincide with a respective rectilinear grid node 14 at which a vector current is to be estimated. Preferably, the sub-region 20 is defined or sized such so that the adjoining sub-regions 20 do not overlap, although a slight overlap therebetween is also within the scope of the present invention.

Figure 2:
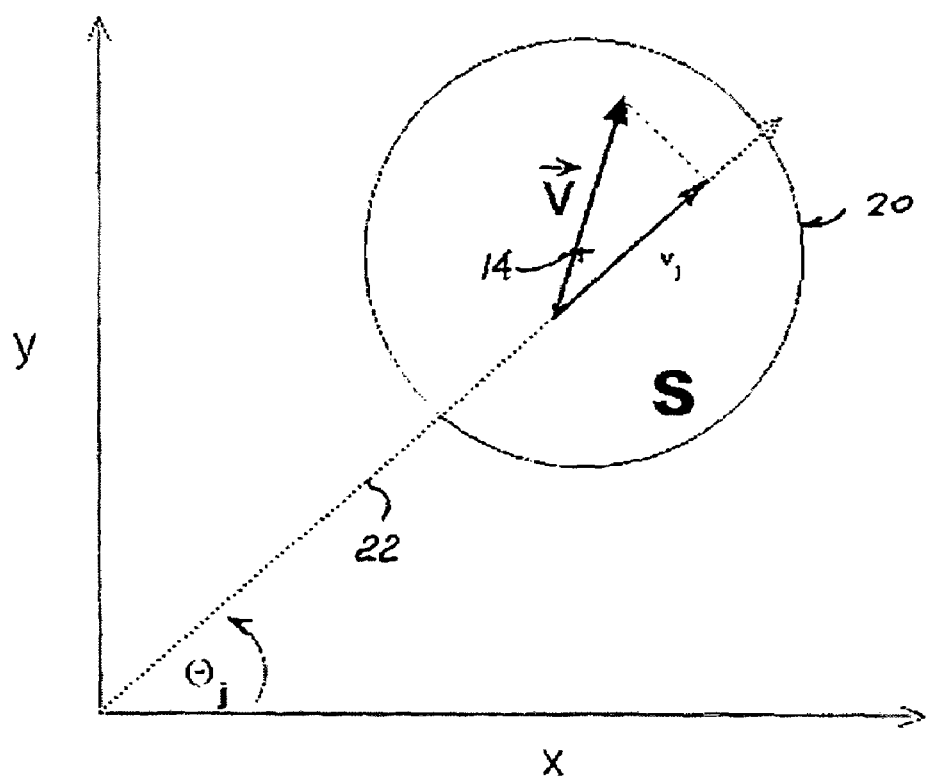
FIG. 2 illustrates geometry of a sub-region of uniform surface current where a radial current component of such surface current is being measured along the radial radar beam line.

Now in further reference to FIG. 2, each sub-region 20 is spanned with at least one beam 22 formed by the single radar station 2. As it is well known, the uniform current V within the sub-region 20 has a radial projection on a radial radar beam line 22 along the (angular beam) $\Theta_j$ direction which is referenced as $v_j$. It can easily be shown that the following equation is true:

$$v_j = V_x \text{Cos}(\Theta_j) + V_y \text{Sin}(\Theta_j)$$

where $V_x$ and $V_y$ are the x and y components of the surface current V.

To improve accuracy of the measurements, each sub-region 20 is spanned by n plurality of radial beams 22. Then, a following system of the equations can be obtained:

$$v_j = V_x \text{Cos}(\Theta_j) + V_y \text{Sin}(\Theta_j)$$
$$v_{j+1} = V_x \text{Cos}(\Theta_{j+1}) + V_y \text{Sin}(\Theta_{j+1})$$
$$v_{j+2} = V_x \text{Cos}(\Theta_{j+2}) + V_y \text{Sin}(\Theta_{j+3})$$
$$\ldots$$
$$v_{j+n} = V_x \text{Cos}(\Theta_{j+n}) + V_y \text{Sin}(\Theta_{j+n}),$$

where n is the number of radial beams 22 formed by the single radar station 2.

Furthermore, each radial beam 22 is divided into a plurality of m sub-nodes 24, for example, with a radar measurement of $v_j$ performed at each sub-node 24. Accordingly, a system of n times m linear equations is obtained for each sub-region 20.

The form of this system of equations represents a well known example of a multiple regression model having two regressors. The model is linear in the unknown regression coefficients, $V_x$ and $V_y$. Thus, standard regression techniques can be used to determine the surface current vector components $V_x$ and $V_y$ of the unknown surface current in the sub-region 20. Preferably the linear equations are solved, in a conventional manner, for values of vector components $V_x$ and $V_y$ with a computer based algorithm.

Each value of surface current is then stored to a database.

Figure 3:
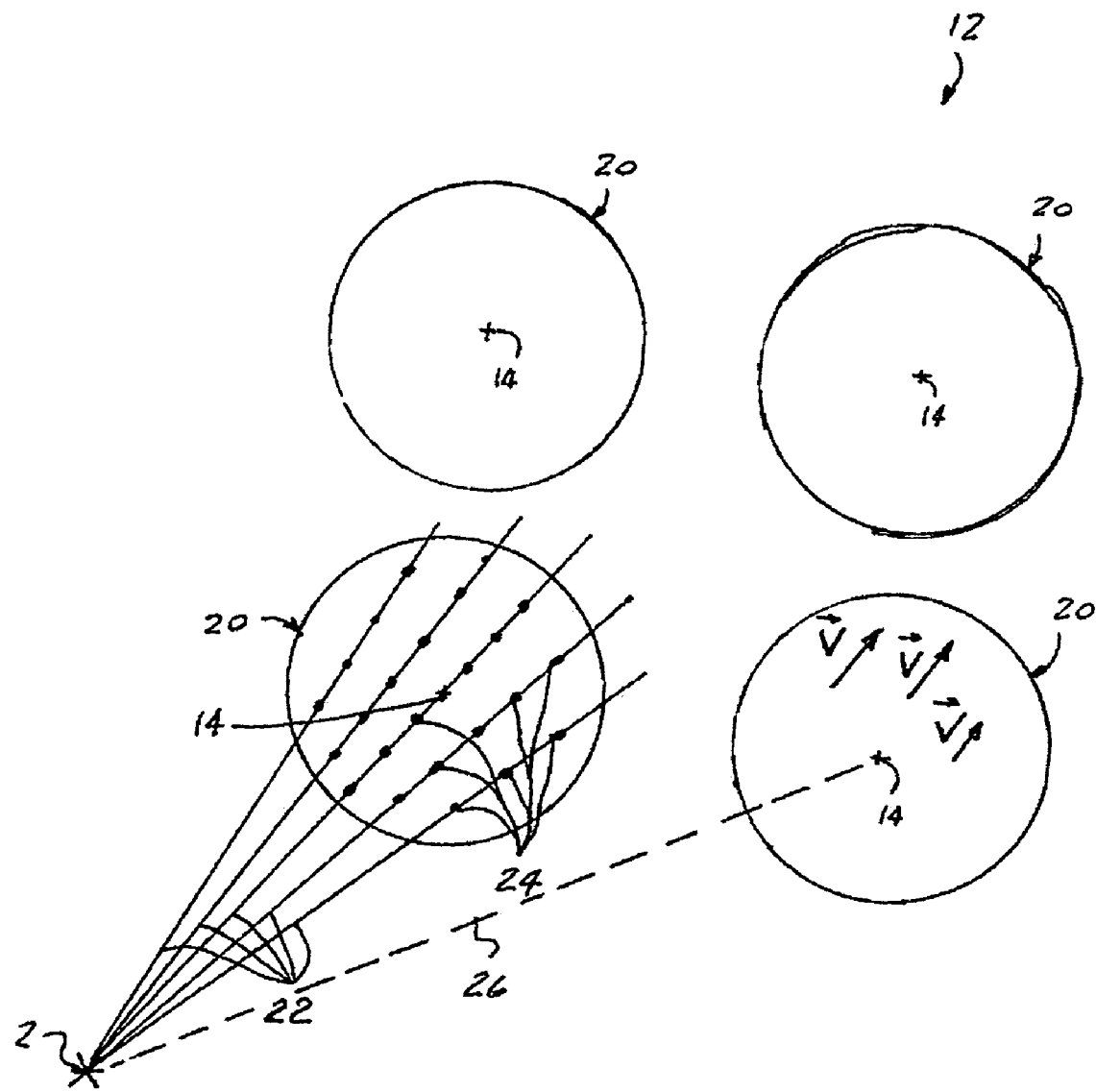
FIG. 3 illustrates application of a method of the present invention for measuring surface current within a preselected sub-region.

The number of radial beams 22 per sub-region 20 and the number of sub-nodes 24 on each radial beam 22 are based on the range 26 and resolution capabilities of a specific single radar station 2. Although, only five radial beams 22 are illustrated in FIG. 3, other number of radial beams 22 may be employed in the present invention. It has been found sufficient to space radial beams 22 at one degree increment and to space sub-nodes 24 at one kilometer intervals.

Figure 4:
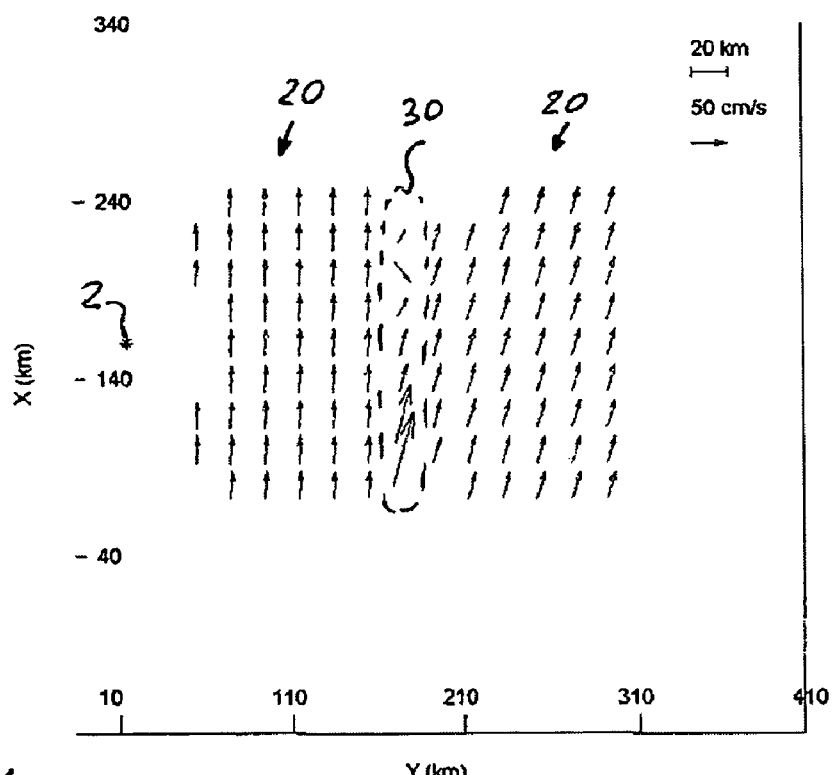
FIG. 4 is a vector surface current map, particularly illustrating a pair of sub-regions each having a distinct surface current flow direction.

The resulting vector surface currents map is illustrated by way of one example of FIG. 4 wherein a pair of adjoining sub-regions 20 is shown. The surface current in one sub-region 20 is flowing at 40 centimeters/second in the x direction and is centered at an angle of 90° at a range of 150 kilometers with a radius of 100 kilometers. The surface current in another sub-region 20 is flowing at 40 centimeters/second at angle of 15° with respect to the x-axis and is centered at an angle of 90° at a range of 250 kilometers with a radius of 100 kilometers.

Once the grid 12 of surface current components has been calculated in accordance to the above multiple regression model, the final essential step of the present method is to remove from the database zones of non-uniform current flow or vectors. Such zone is best illustrated in FIG. 4 as zone 30 between the pair of adjoining sub-regions 20.

In accordance with a presently preferred embodiment of the invention, this step is achieved by editing, with equation of continuity based computer algorithm, plurality of currents vector components $V_x$ and $V_y$ stored in the database.

The present invention contemplates that because water is essentially incompressible, if any water leaves a region along a horizontal flow it must be replenished by an inward flow. This theory finds its analogy in a fluid flow within a pipe where fluid flowing into the pipe must leave at the same rate as the fluid leaving the pipe. Otherwise, the fluid can't flow in a "continuous" sense. In other words, there can be no sources or sinks at a point where a surface current is flowing. In mathematical terms, the divergence of the surface current flow is zero or the divergence of the velocity is zero.

Thus, it can be shown that equation of continuity $$\nabla \cdot v = 0,$$

where $\nabla$ is the divergence operator applies in the present invention stipulating uniform surface current flow within sub-region 20.

If V has components $V_x$ and $V_y$ then the above equation is simply $$\frac{\partial V_x}{\partial x} + \frac{\partial V_y}{\partial y} = 0$$

The equation of continuity is then solved in a conventional manner, preferably by a computer based algorithm.

Figure 5:
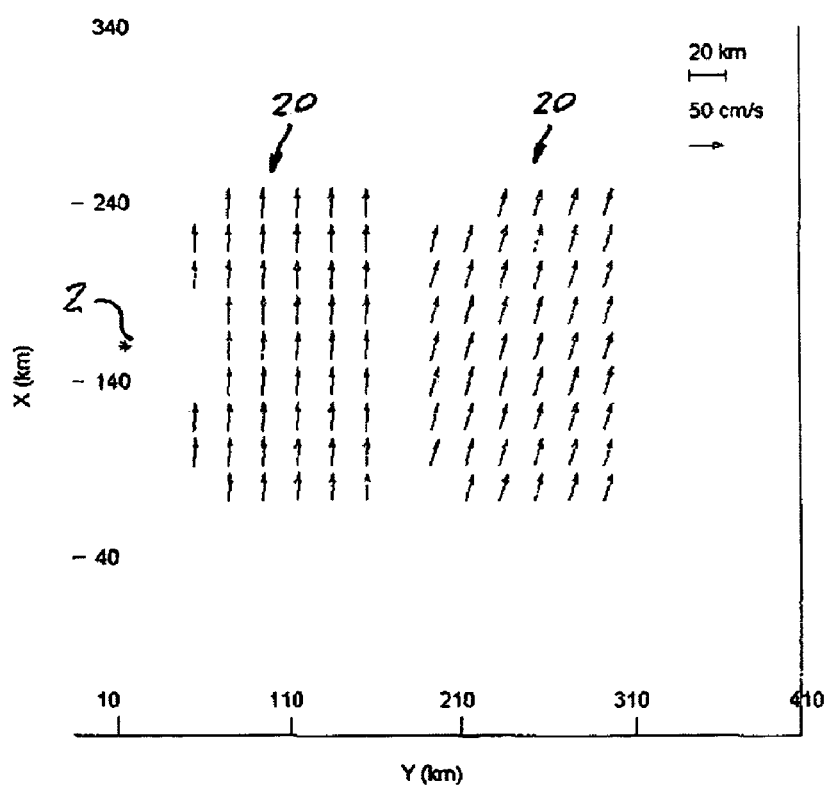
FIG. 5 is a vector surface current map of FIG. 4 optimized with employment of equation of continuity.

Therefore by applying this equation of continuity to a pair of adjacent nodes 14 in the assumed uniform current grid 12, one can remove surface current vectors that violate this condition. Specifically, data for a selected node 14 is compared with like data for an adjacent node 14 and the difference between the data is determined. If the difference between adjacent x components and adjacent y components for the pair of compared adjacent nodes 14 is greater than a predetermined threshold, then the surface current at the node 14 in question should be removed from the database. Such predetermined threshold may be a zero or some small tolerance value to compensate for radar measurement noise. The resulting edited current surface is illustrated in FIG. 5.

Figure 7:
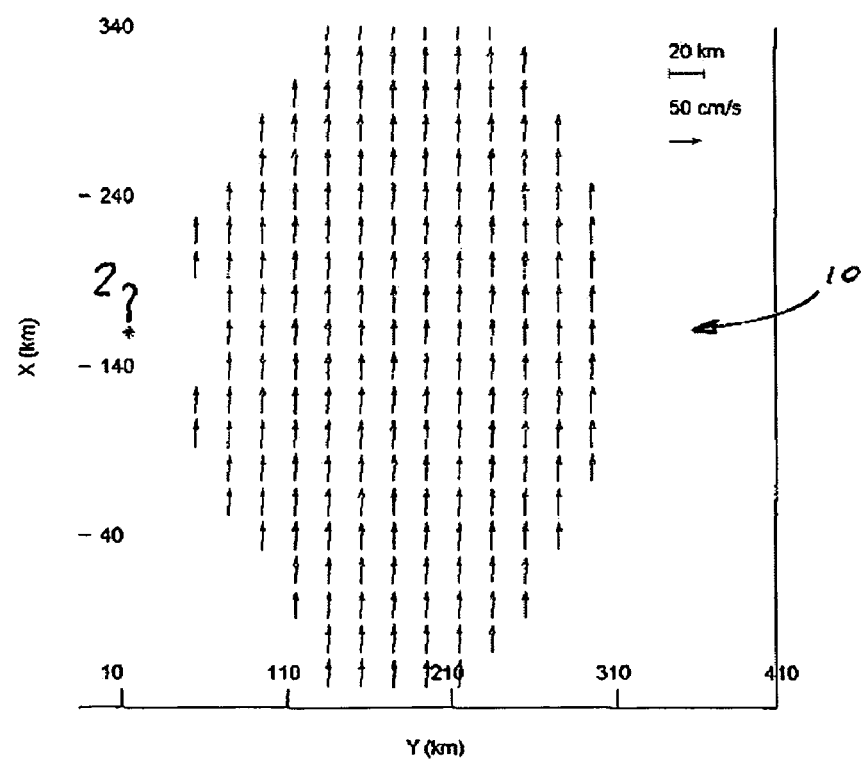
FIG. 7 illustrates a vector surface current map of FIG. 6.

It can be seen in FIG. 7 that removed surface current vectors differs in at least one of a magnitude and direction.

Figure 6:
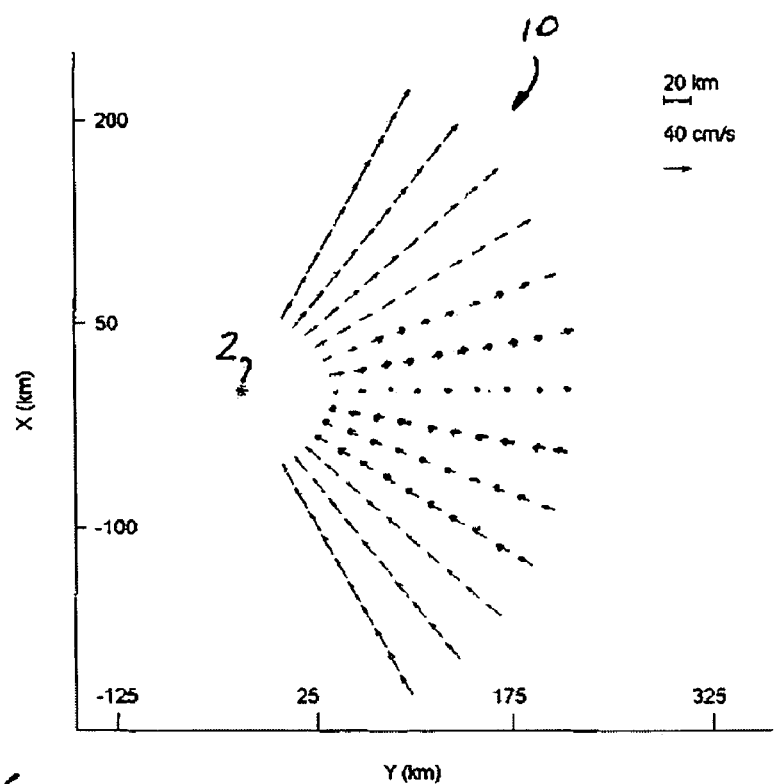
FIG. 6 illustrates a radial surface current map illustrating a single region having uniform surface current flowing along the x direction.

In accordance with another form, the present invention stipulates that the surface current is assumed uniform over an extended region that encompasses the entire radar coverage zone. The respective radial surface current map is illustrated in FIG. 6. The same multiple regression model is applied to calculate the vector current at each node on a grid. For this condition there is no need to use the equation of continuity since there is no discontinuity in the flow of the surface current. The resulting vector surface current map is illustrated in FIG. 7.

Thus, the present invention operates on a principle that the surface current is uniform within the region to be monitored. Then, only one single radar station 2 is required to generate necessary surface current data. If this principle is not valid then the results are unpredictable. However, by applying the equation of continuity to the surface current data generated when assuming a uniform current, the data can be filtered or edited to remove erroneous points of non-uniform flow.

By using the combination of multiple regression model to generate the surface current flow and equation of continuity to edit generated surface current flow, the present invention departs from the conventional wisdom of using the equation of continuity to generate the surface current flow which has been found undesirable by Barrick in U.S. Pat. No. 6,590,523.

Although the present invention has been shown in terms of determining long-range ocean surface currents, usually for a range of about 300 kilometers from the radar site, it will be apparent to those skilled in the art, that the present invention may be equally applied to determining short-range ocean surface currents.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A method for measuring ocean surface currents using a long-range single station high frequency ground wave radar system, said method comprising the steps of:
   (a) selecting a target region with a uniform surface current flow from a coverage area of said single radar system;
   (b) spanning said target region with a predetermined plurality of radial beam lines from said single radar station;
   (c) dividing each radial beam line into a pre-selected plurality of radial sub-nodes;
   (d) measuring, with said single radar system, radial surface current vector projection at each radial sub-node;
   (e) inputting each radial surface current vector projection into a multiple regression model having two regressors; and
   (f) determining, with said multiple regression model, surface vector component values along each of x and y axis.

2. The method, according to claim 1, wherein the step of selecting a target region includes the step of forming a rectilinear grid.

3. The method, according to claim 2, wherein the step of forming a rectilinear grid includes the step of selecting each of a longitudinal and latitudinal coordinate of a corner point of said target region, the step of selecting number of nodes in each of a longitudinal and latitudinal direction and the step of selecting separation interval between a pair of adjacent nodes in said each of said longitudinal and latitudinal direction.

4. The method, according to claim 2, wherein the step of selecting separation interval between said pair of adjacent nodes includes the step of optimizing visual mapping of surface currents.

5. The method, according to claim 1, wherein said step of selecting said target region includes the step of selecting said coverage area of said single radar system.

6. The method, according to claim 1, wherein said method includes the additional step of mapping surface currents vectors.

7. The method, according to claim 1, wherein said method includes the additional step of storing said surface vector components along each of x and y axis determined in step (f) to a database.

8. The method, according to claim 1, wherein said step of determining said surface vector components along each of x and y axis includes the step of solving, with a computer based algorithm, a predetermined plurality of linear equations.

9. A method for measuring ocean surface currents using a long-range single station high frequency ground wave radar system, said method comprising the steps of:
 (a) selecting a target region from a coverage area of said single radar system;
 (b) dividing each target region into a plurality of sub-regions each having a central node and a uniform surface current flow therewithin;
 (c) spanning each sub-region with a predetermined plurality of radial beam lines from said single radar station;
 (d) dividing each radial beam line into a pre-selected plurality of radial sub-nodes;
 (e) measuring, with said single radar system, radial surface current vector projection at each radial sub-node;
 (f) inputting each radial surface current vector projection into a multiple regression model having two regressors;
 (g) determining, with said multiple regression model, surface vector components along each of x and y axis;
 (h) storing said surface vector components determined in step (g) to a database; and
 (i) removing, from said database, zones of non-uniform current flow.

10. The method, according to claim 9, wherein said step of removing regions of non-uniform current flow includes the step of editing, with equation of continuity based algorithm, plurality of surface vector components stored in said database in step (h).

11. The method, according to claim 10, wherein said step of editing includes the step of comparing data for a selected central node with a data for an adjacent central node, the step of determining a difference between said values and the step of removing from said database selected surface current vectors when said difference is greater than a predetermined threshold.

12. The method, according to claim 11, wherein said step of removing said zones of non-uniform current flow includes the step of removing from said database surface current vectors of at least one of different magnitudes and directions.

13. A method for measuring ocean surface currents using a long-range single station high frequency ground wave radar system, said method comprising the steps of:
 (a) forming a rectilinear grid based region within a coverage area of said single radar system;
 (b) dividing said rectilinear grid into a plurality of sub-regions each having a uniform surface current flow therewithin;
 (c) spanning each sub-region with a predetermined plurality of radial beam lines from said single radar station;
 (d) dividing each radial beam line into a pre-selected plurality of radial sub-nodes;
 (e) measuring, with said single radar system, radial surface current vector projection at each radial sub-node;
 (f) inputting each radial surface current vector projection into a multiple regression model having two regressors;
 (g) determining, with said multiple regression model, surface vector components along each of x and y axis;
 (h) storing said surface vector components determined in step (g) to a database; and
 (i) editing, with equation of continuity based algorithm, plurality of surface vector components stored in said database in step (h).

* * * * *